United States Patent Office.

JULIUS KIRCHER, OF CANNSTADT, NEAR STUTTGART, WÜRTEMBURG.

Letters Patent No. 110,048, dated December 13, 1870.

IMPROVEMENT IN PRINTING-INKS.

The Schedule referred to in these Letters Patent and making part of the same.

*To all whom it may concern:*

Be it known that I, JULIUS KIRCHER, of Cannstadt, near Stuttgart, in the Kingdom of Würtemberg, have invented a "new Printing-Ink;" and I do hereby declare that the following is a full, clear, and exact description of the same.

My invention relates to printing-ink, and consists of a new compound for that purpose, whose elements will be hereinafter described by name, proportion, and mode of application.

The main advantages to the public of my printing-ink are three in number.

First, it is entirely free from any admixture of carbonicum or lamp-black, while a fine black is nevertheless obtained;

Secondly, it is removable from paper by a solution of chloride of lime and hydrochloric acid; and Thirdly, it can be manufactured at a cheaper rate than any corresponding ink now in the market.

The compound is formed of hydrated peroxide and hydrated protoxide of iron, mixed in the proportions, respectively, of 10 to 6.

I first take the moist hydrated peroxide and protoxide of iron, mix them well together, and allow them to remain undisturbed for several hours. I then mix therewith about three times as much water, by measure, as there is of the mixture, and boil till the whole is evaporated to a fine black velvety powder.

This powder is then washed, dried, and mixed with varnish, whose proportion may vary according to the quality of ink desired. I preferably employ the varnish in a quantity varying from two-thirds the aggregate of the peroxide and protoxide to an equal quantity therewith.

Having thus described all that is necessary to a full understanding of my invention,

What I esteem to be new, and desire to protect by Letters Patent, is—

A compound, formed of ten parts of peroxide and six parts of protoxide of iron, prepared as specified, and applied in a solution of varnish to form printing-ink.

JULIUS KIRCHER.

Witnesses:
H. BREISMANN,
ANTON LITTHAUER.